US 8,396,617 B2

(12) United States Patent
Puig et al.

(10) Patent No.: US 8,396,617 B2
(45) Date of Patent: Mar. 12, 2013

(54) METHOD AND DEVICE FOR AIDING THE LATERAL CONTROL OF AN AIRCRAFT DURING AN APPROACH PHASE

(75) Inventors: Stéphane Puig, Lauzerville (FR); Jérôme Gauvin, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 232 days.

(21) Appl. No.: 12/842,563

(22) Filed: Jul. 23, 2010

(65) Prior Publication Data

US 2011/0022251 A1    Jan. 27, 2011

(30) Foreign Application Priority Data

Jul. 23, 2009  (FR) ...................... 09 03636

(51) Int. Cl.
*G06F 19/00* (2006.01)
*G01C 21/00* (2006.01)

(52) U.S. Cl. ............................ 701/16; 340/972; 340/979
(58) Field of Classification Search ...................... None
See application file for complete search history.

(56) References Cited

U.S. PATENT DOCUMENTS

| | | | |
|---|---|---|---|
| 3,815,850 A | 6/1974 | Tribuno et al. | |
| 4,482,961 A | 11/1984 | Kilner et al. | |
| 5,113,346 A | 5/1992 | Orgun et al. | |
| 5,745,054 A * | 4/1998 | Wilkens | 340/972 |
| 2001/0052562 A1 * | 12/2001 | Ishihara et al. | 244/175 |
| 2007/0032924 A1 | 2/2007 | Foucart et al. | |

* cited by examiner

*Primary Examiner* — Fahd Obeid
(74) *Attorney, Agent, or Firm* — Novak Druce Connolly Bove + Quigg LLP

(57) ABSTRACT

An assistance method and device for lateral control of an aircraft upon an approach phase is disclosed. The device (1) comprises means (25) to predict in flight a risk of runway lateral excursion and means (20) to advise the pilot of the aircraft about the existence of such a risk.

9 Claims, 2 Drawing Sheets

METHOD AND DEVICE FOR AIDING THE LATERAL CONTROL OF AN AIRCRAFT DURING AN APPROACH PHASE

The present invention relates to an assistance method and device for a lateral control of an aircraft, in particular a transport plane, upon an approach phase onto a runway of an airport, so as to land on such a runway.

More precisely, the present invention aims at detecting in flight, during the final approach phase, a risk of a (future) lateral excursion off the runway provided for the landing (upon aircraft running on such a runway after touching down).

US-2007/0032924 and FR-2,884,022 disclose an assistance method for lateral control of an airplane. Such method is however provided exclusively when the aircraft runs on the landing runway. According to such method, the following steps are performed, consisting in:

measuring a lateral deviation of the airplane with respect to a lateral alignment beam which is emitted by a radio emitter arranged on the ground downstream of the downstream end of the runway, such a lateral deviation representing an angular deviation being defined in an horizontal plane between, on the one hand, a line going through the radio emitter and by a sensor which is arranged on board the plane and is able to detect the lateral alignment beam and, on the other hand, the central axis of the runway;

calculating a first distance which is defined in the horizontal plane, along the runway, between the pilot's position in the cockpit of the airplane and the radio emitter;

determining from the so-measured lateral deviation and the so-measured first distance, a line adapted to correspond to the central axis of the runway; and showing such line on a visualization screen of a windshield projection display of the airplane, being superimposed with the existing environment at the front of the airplane, such line being presented in a conform lay-out so as to be shown in a superimposition with the central axis of the runway.

Thus, such known method enables to show to the pilot on a visualization screen of a windshield projection display a line being shown in perspective, being superimposed with the central axis of the runway. Consequently, even when visibility is very poor, the pilot always knows where such central axis is located, and he can thus pilot the plane so that it is centred on such central axis et is thus located in the middle of the runway.

The present invention aims at detecting a future risk of lateral excursion, when the aircraft is still in flight (upon a final approach phase).

It is known that the operations and maneuvers implemented in presence of a cross wind or related to the approach need not only the respect for landing limitations (maximum cross wind), but also the respect for certain piloting methods. In fact, due to certain operational factors, certain piloting methods adapted to position the aircraft with respect to the runway axis can lead to situations for which the aircraft is going obviously to be on the runway axis upon touching down, but with a path laterally diverging (with respect to said runway axis).

Indeed, if the lateral velocity upon touching down is high, the aircraft may deviate on the runway and be submitted to a lateral excursion (that is to say a runway exit) off said runway.

Such a situation can occur further to an implementation of a flare maneuver. A flare maneuver consists in performing a pitch-up of the aircraft before touching down and corresponds to a transition between the attitude upon the final approach phase and the attitude upon touching down. It is known that during a flare, in case of a flight with a cross wind, the fin (that is to say the yaw control surface) should be used to align the aircraft with the runway heading and the appearance of a roll should be counterbalanced through roll control surfaces (ailerons, spoilers) of the aircraft. Moreover, in the case of a strong wind, the aircraft may land with some slipping so as to avoid having too much roll, but such slipping must be limited (at the maximum, generally) 5° to avoid the appearance of charges being too big on the landing gear upon touching down.

However, upon a flare, sometimes an excessive use by the pilot of the yaw control surface occurs and that may lead to slipping being opposed to those aimed at. Also, sometimes an excessive use of the yaw control surface occurs so as to recover a route instead of the use of roll control surfaces. Such excessive use of the yaw control surfaces enables to recover a heading, but not a ground track of the aircraft, thus generating a divergence between the aircraft heading and the ground track, and can lead to runway exit.

The present invention aims at obviating the above-mentioned disadvantages. It relates to a lateral control method for an aircraft upon an approach phase onto a landing runway for a landing, allowing for a pilot of the aircraft to be advised in flight about a future risk of a lateral excursion off the landing runway upon running at the ground (immediately further to touching down upon landing).

For this end, according to the invention, said method is remarkable in that, during aircraft flight upon the approach to the landing runway, automatically and repetitively, the sequence of following successive operations is performed, consisting in:

a) determining a current drift angle of the aircraft;

b) calculating a current drift velocity of the aircraft with the help of the current drift angle being determined at step a);

c) carrying out a prediction of a lateral drift of the aircraft with the help of the current drift velocity being calculated at step b) and a prediction time;

d) comparing such lateral drift to a threshold value;

e) also monitoring the variation of the drift angle of the aircraft;

f) predicting a runway lateral excursion when, simultaneously:

at step d), the lateral drift is higher than the threshold value; and at step e), the drift angle grows; and g) in the case of a prediction of runway lateral excursion, an alarm signal is emitted for an operator of the aircraft.

Thus, through the invention, it is possible to predict with precision upon the final approach phase, that is to say in flight before touching down on the landing runway, a future risk of a lateral excursion off the runway and to prevent an operator, in particular the aircraft pilot. Thus, this latter can be advised sufficiently soon (in the case of a risk of an runway exit) to take the right decisions, including an appropriate correction of the lateral deviation or, if necessary, a go-around so as to prevent an excursion off the landing runway upon running on the latter.

To perform such prediction, according to the invention, the level of a possible lateral deviation of the aircraft is estimated in a near future (prediction time) depending on the current flight conditions (current drift angle, current ground velocity, etc.) and is compared to a threshold value to know if it is acceptable. Simultaneously, the drift angle is monitored so as to emit no alarm signal if the pilot activates controls so as to reduce the drift angle (that is to say to reduce the aircraft parameter at the origin of the risk).

Advantageously, at step a), if the aircraft comprises onboard means so as to be able to determine usually the drift angle, the drift angle determined by such usual means can be used directly. On the contrary, to determine the current drift angle, the difference between the current heading and the current route angle of the aircraft is calculated.

Besides, advantageously, to calculate the current drift velocity, the current drift angle is multiplied by a current ground velocity of the aircraft.

Further, advantageously, the prediction time T is calculated through the following expression:

$$T=L/(D \cdot VSOL)$$

wherein:
D is a maximum drift angle;
VSOL is a ground velocity of the aircraft; and
L is half the width of the landing runway.

In a preferred embodiment, said prediction time can be variable and depend for example on the aircraft height with respect to the ground. In particular, far from the ground, at a predetermined height (for example at 100 feet, i.e. at about 30 meters), the prediction time can correspond to a reduced value that increases then progressively (as the height decreases) up to reaching, near ground, the value T calculated through the previous expression. Such prediction time being used to predict a future deviation of the aircraft, it is not necessary to perform a prediction over too a long distance (at the front of the aircraft) at a big height, i.e. to use a long prediction time, since, the aircraft being far from the ground at such height, the pilot has enough time, if necessary, to recover the path to be followed.

Furthermore, advantageously, the threshold value can correspond to a predetermined value, for example thirty meters, or it can also depend on the width of the landing runway.

Moreover, advantageously:
the set of steps a) to g) is implemented only if the aircraft is at a height (with respect to the ground) being lower than a predetermined height, for example 100 feet (about 30 meters); and/or
at least the emission of an alarm signal [i.e. the step g)] is inhibited if (according to current flight conditions) the aircraft will touch the ground within a period being lower than a predetermined period, for example a few seconds.

The present invention also relates to an assistance device for lateral control of an aircraft, in particular a transport air plane, upon an approach phase onto a landing runway for a landing.

According to the invention, said device is remarkable in that it comprises:
first means to determine a current drift angle;
second means to calculate a current drift velocity of the aircraft through said current drift angle determined by the first means;
third means to implement a prediction of a lateral drift of the aircraft through the current drift velocity calculated through the current drift velocity calculated by the second means et of a prediction time;
fourth means to compare such lateral drift to a threshold value;
fifth means to monitor the variation of the drift angle of the aircraft;
sixth means to predict a runway lateral excursion, when simultaneously:
said fourth means show that the lateral drift is higher than the threshold value; et
said fifth means show that the drift angle grows; et
seventh means to emit an alarm signal for an operator of the aircraft, in the case of a prediction of a runway lateral excursion, by said sixth means.

The present invention also relates to an aircraft, in particular a transport airplane, which comprises a device such as above-mentioned.

The figures of the accompanying drawing will well show how the invention can be implemented. On such figures, like references show like items.

Figure 1:
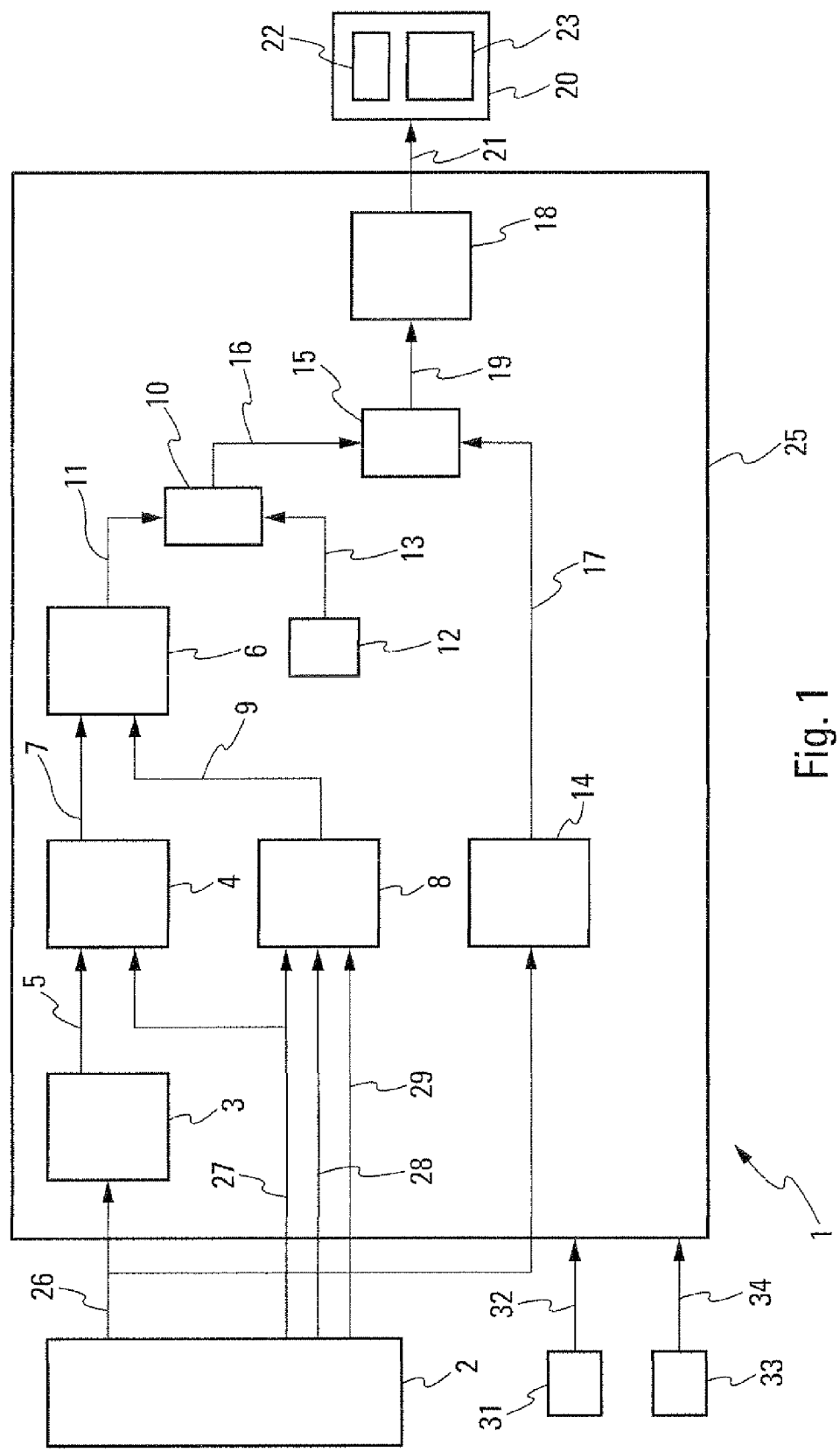
FIG. 1 is the block diagram of a device in accordance with the invention.

The device 1 in accordance with the invention and schematically shown on FIG. 1 is provided to assist an operator, in particular a pilot of an aircraft A, for example a transport airplane, upon an approach phase onto a landing runway, for a landing on such runway.

To this end, said device 1 which is on board the aircraft A comprises according to the invention:
a set 2 of information sources which provide particularly the current values of flight parameters (height with respect to ground, ground velocity, etc.) of the aircraft A, as below specified;
means 3 for determining a current drift angle of the aircraft A;
means 4 for calculating a current drift velocity of the aircraft A, with the help of the current drift angle determined by means 3 and received through a link 5;
means 6 to perform a prediction of a lateral drift of the aircraft A through the current drift velocity, calculated by means 4 and received through a link 7, and a prediction time as below specified, being calculated by means 8 et received through a link 9;
means 10 which are connected to means 6 through a link 11 and compare the lateral drift determined by said means 6 to a threshold value received from a member 12 (for example a memory) through a link 13;
means 14 to monitor the variation of the drift angle of the aircraft A, for example by comparing between them current successive values of the drift angle (received from said set 2 or said means 3);
means 15, including a logic gate AND, which are connected through links 16 and 17 respectively to said means 10 and 14, and which are adapted to show if conditions below specified and checked by means 10 et 14 are simultaneously filled;
means 18 being associated through a link 19 with said means 15 and which are adapted to predict an runway lateral excursion. According to the invention, said means 18 predict a runway lateral excursion when simultaneously:
means 10 show, further to their comparison, that the lateral drift is higher than the threshold value; and
means 14 show, further to their monitoring, that the drift angle grows; and
alarm means 20 which are connected through a link 21 to said means 18 and which are adapted to emit an alarm signal for an operator of the aircraft A, in particular a pilot, when said means 18 predict a runway lateral excursion.

Said alarm means 20 can comprise:
means 22 which emit a sound type alarm, including in the cockpit of the aircraft; and/or
display means 23 which show, on at least one screen of the cockpit, indications representing a visual alarm signal.

Thus, the device 1 according to the invention is adapted to predict precisely in real time during the final approach phase, that is to say in flight before touching down onto the landing runway, a future risk for a runway lateral excursion and to warn an operator, in particular the pilot of the aircraft (through the alarm means 20). Thus, the latter can be advised soon enough to take the right decisions, namely an in-flight correction of the lateral deviation by implementing the control surfaces being appropriate for the current situation or, if necessary, a go-around, so as to avoid an excursion off the landing runway upon running on the latter.

To perform such prediction relative to a risk of a runway exit, according to the invention, said means 6 estimate the level of a lateral deviation in a near future (prediction time) and means 10 compare it to a threshold value to know if it is acceptable. Simultaneously, means 14 monitor the drift angle so as not to emit any alarm signal if the pilot performs orders enabling to reduce the drift angle and thus compensate for such a risk of runway exit.

The device 1 in accordance with the invention is convenient for any approach type, namely an approach being manually implemented by the pilot as well as an approach being automatically implemented.

Moreover, except for the set 2 of information sources and the means 20 for the emission of an alarm signal, the other means 3, 4, 6, 8, 10, 12, 14, 15 at 18 may be part of one and the same calculation unit 25.

Figure 2:
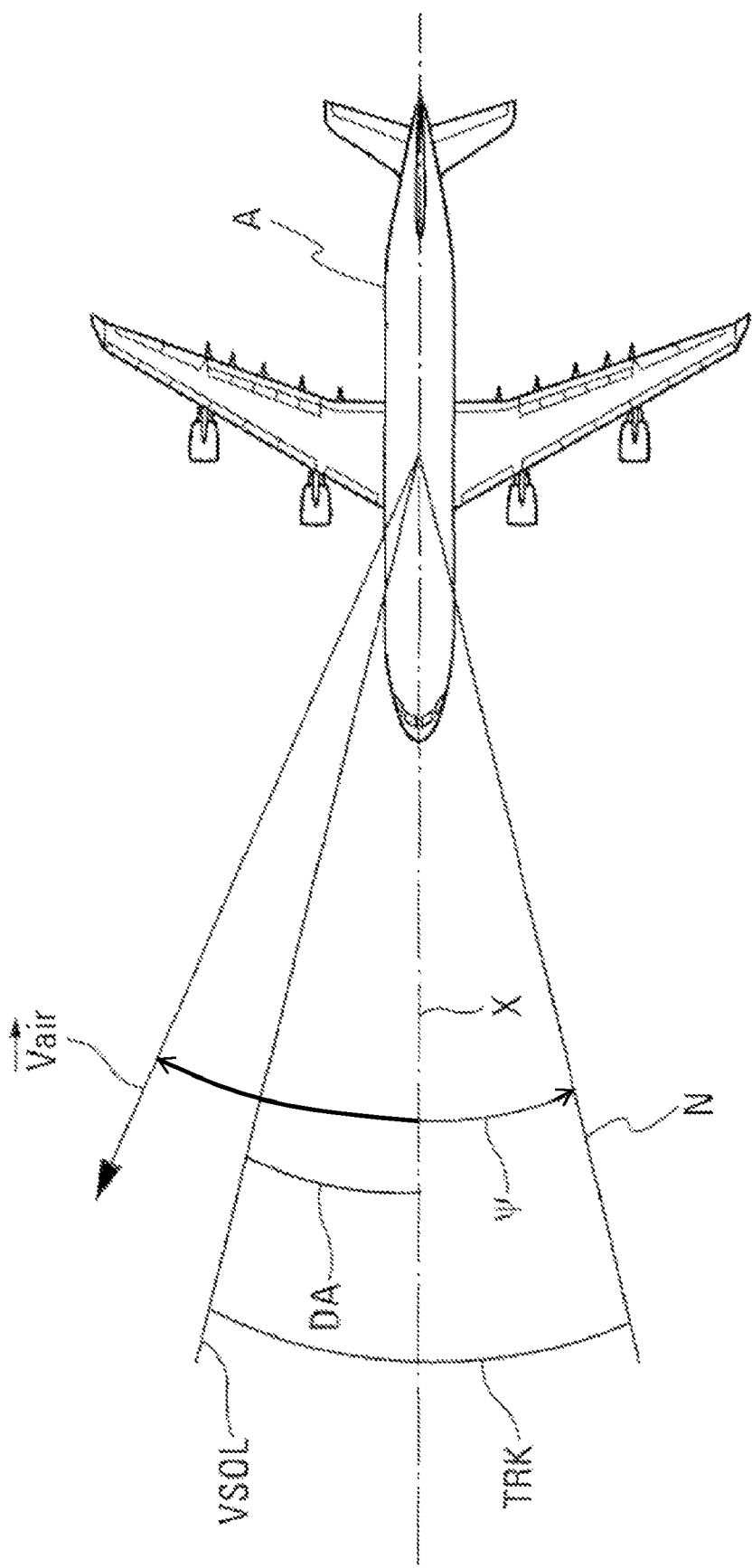
FIG. 2 is a schematic plan view enabling to emphasize different angles used by the device in accordance with the invention.

The means 3 are connected through a link 26 to the set 2 and are adapted to determine the drift angle DA shown on FIG. 2. To do so, in a first embodiment, the set 2 comprises means for generating, in a usual way, said drift angle DA. In such a case, means 3 simply recover the so-generated drift angle DA.

Further, in a second embodiment, said means 3 calculate the drift angle DA through the following expression:

$$DA = TRK - \psi$$

wherein TRK is, for example, expressed in degrees, and represents the ground track of the route of the aircraft A which corresponds to the angle between the North N and the velocity VSOL. The angle $\psi$ is, for instance, expressed in degrees et represents the heading of the aircraft A which is defined between the North N and the air velocity Vair of said aircraft A. The angles TRK et $\psi$ are generated in a usual way by means being part of the set 2.

Moreover, to calculate the current drift velocity, the means 4 multiply the current drift angle DA received by means 3 by the current ground velocity of the aircraft A, which is generated on a usual way by means being part of the set 2 and which is transmitted through a link 27.

Further on, said means 8 calculate said prediction time T through the following expression:

$$T = L/(D \cdot VSOL)$$

wherein:
  D is a predetermined maximum drift angle;
  VSOL is the ground velocity of the aircraft A received through the link 27; and
  L is half the width of said landing runway or a predetermined value, for example thirty meters, received through a link 28.

In a special embodiment, means 8 make said prediction time depend on the height of the aircraft with respect to the ground, which is received through a link 29. In particular, far from the ground, at a predetermined height (for example at 100 feet), the prediction time can correspond to a reduced value (for example predetermined) which increases then progressively up to reaching, in the vicinity of the ground, the value T being calculated through the previous expression. Such a prediction time being used to predict a future deviation of the aircraft A, it is not necessary to perform a prediction over too long a distance (in the front of the aircraft A) at a big height or radio-altitude, i.e. to use a big prediction time, since, the aircraft A being far from the ground at such big height, the pilot has enough time, if necessary, to recover the path to be followed.

Moreover, said threshold value, being used by means 10, can either correspond to a predetermined value, for example 22.5 or 30 meters or depend on the width of the landing runway and correspond for example to half L of such width.

The device 1 in accordance with the invention may comprise additionally means 31 being, for example, connected through a link 32 to said calculation unit 25 and being adapted so as to activate the device 1 (to implement the above-mentioned lateral control) only if the aircraft A is at a height being lower than a predetermined height, for example 100 feet (about 30 meters). That enables to limit the implementation of the present invention upon the final approach phase for which it is provided.

Besides, the device 1 can also comprise means 33 which are, for example, connected through a link 34 to said calculation means 25 and are adapted to inhibit either the operation of the device 1, or only the emission of an alarm signal by means 20, when the aircraft A is about to touch down and, in particular, when a go-around is not any more possible. Those inhibition means 34 can be activated when, according to the current flight conditions (vertical velocity, altitude) determined by the set 2, it is proved that the aircraft A will touch down within a period being lower than a predetermined period, for example within a few seconds.

Studies have shown that a runway lateral exit may have as an origin an inappropriate management of the lateral path by the pilot(s), which leads to a divergent path. In fact, for different reasons, that are not determined, probably a big work load during landing, a lack of communication between the crew members, a bad mental representation of the path, . . . , the pilots do not always implement a go-around maneuver when it seems to be necessary. A possible scenario for a runway exit is that, a few seconds before touching down onto the runway, the aircraft A follows a divergent path with respect to the runway axis in association with a growing drift angle. Due to such drift angle, the aircraft A slips upon touching down, following the divergent path, which makes it sometimes impossible to correct the path before the runway exit. Thanks to the invention, the device 1 enables to detect such conditions upon the final approach and to warn the case being les pilots of the aircraft, so as to enable them to take the right decisions (for example a go-around) so as to prevent a runway exit.

The invention claimed is:

1. An assistance method for lateral control of an aircraft (A) upon an approach phase to a landing runway for a landing, wherein, during aircraft (A) flight upon the approach to the landing runway, automatically and repetitively via an onboard calculation unit, the sequence of following successive operations is performed, comprising:
  a) determining via the calculation unit a current drift angle (DA) of the aircraft (A);
  b) calculating via the calculation unit a current drift velocity of the aircraft (A) based at least in part on the current drift angle (DA) being determined at step a);
  c) calculating via the calculation unit a prediction of a lateral drift of the aircraft (A) based at least in part on the current drift velocity being calculated at step b) and a prediction time;

d) comparing via the calculation unit such lateral drift to a threshold value;
e) monitoring via the calculation unit the variation of the drift angle of the aircraft (A);
f) predicting via the calculation unit a runway lateral excursion when, simultaneously: at step d), the lateral drift is higher than the threshold value; and at step e), the drift angle grows; and
g) in the case of a prediction of runway lateral excursion, emitting an alarm signal for an operator of the aircraft (A),
wherein the prediction time T is calculated through the following expression:

$$T=L/(D \cdot VSOL)$$

wherein:
D is a maximum drift angle;
VSOL is a ground velocity of the aircraft (A); and
L is half the width of the landing runway.

2. The method according to claim 1, wherein step a) comprises: determining the current drift angle (DA) and calculating a difference between the current heading ($\psi$) of the aircraft (A) and the current route angle (TRK) of the aircraft (A).

3. The method according to claim 1, wherein step b) comprises: calculating the current drift velocity and multiplying the current drift angle (DA) by a current ground velocity (VSOL) of the aircraft.

4. The method according to claim 1, wherein said prediction time is variable and depends on the aircraft (A) height with respect to the ground.

5. The method according to claim 1, wherein said threshold value depends on the width of said landing runway.

6. The method according to claim 1, wherein the set of steps a) to g) is implemented only if the aircraft (A) is at a height with respect to the ground being lower than a predetermined height.

7. The method according to claim 1, wherein at least the emission of an alarm signal at step g) is inhibited if, according to current flight conditions, the aircraft (A) will touch down within a period being lower than a predetermined period.

8. An assistance device for lateral control of an aircraft (A) upon an approach phase onto a landing runway for a landing, the device comprising
a calculation unit configured:
to determine a current drift angle (DA) of the aircraft (A);
to calculate a current drift velocity of the aircraft (A) through said current drift angle (DA);
to implement a prediction of a lateral drift of the aircraft (A) through the current drift velocity calculated by the second means et a prediction time;
to compare such lateral drift to a threshold value;
to monitor the variation of the drift angle of the aircraft;
to predict a runway lateral excursion, when simultaneously:
the lateral drift is higher than the threshold value; and
the drift angle grows; and
an alarm for emitting a signal for an operator of the aircraft (A), in the case of a prediction of a runway lateral excursion, wherein the prediction time T is calculated through the following expression:

$$T=L/(D \cdot VSOL)$$

wherein:
D is a maximum drift angle;
VSOL is a ground velocity of the aircraft (A); and
L is half the width of the landing runway.

9. An aircraft comprising an assistance device for lateral control of the aircraft (A) upon an approach phase onto a landing runway for a landing, the device comprising
a calculation unit configured:
to determine a current drift angle (DA) of the aircraft (A);
to calculate a current drift velocity of the aircraft (A) through said current drift angle (DA);
to implement a prediction of a lateral drift of the aircraft (A) through the current drift velocity calculated by the second means et a prediction time;
to compare such lateral drift to a threshold value;
to monitor the variation of the drift angle of the aircraft;
to predict a runway lateral excursion, when simultaneously:
the lateral drift is higher than the threshold value; and
the drift angle grows; and
an alarm for emitting a signal for an operator of the aircraft (A), in the case of a prediction of a runway lateral excursion, wherein the prediction time T is calculated through the following expression:

$$T=L/(D \cdot VSOL)$$

wherein:
D is a maximum drift angle;
VSOL is a ground velocity of the aircraft (A); and
L is half the width of the landing runway.

* * * * *